APPARATUS FOR SPECIFIC GRAVITY SEPARATION OF SOLID PARTICLES
Original Filed June 10, 1966 4 Sheets-Sheet 1
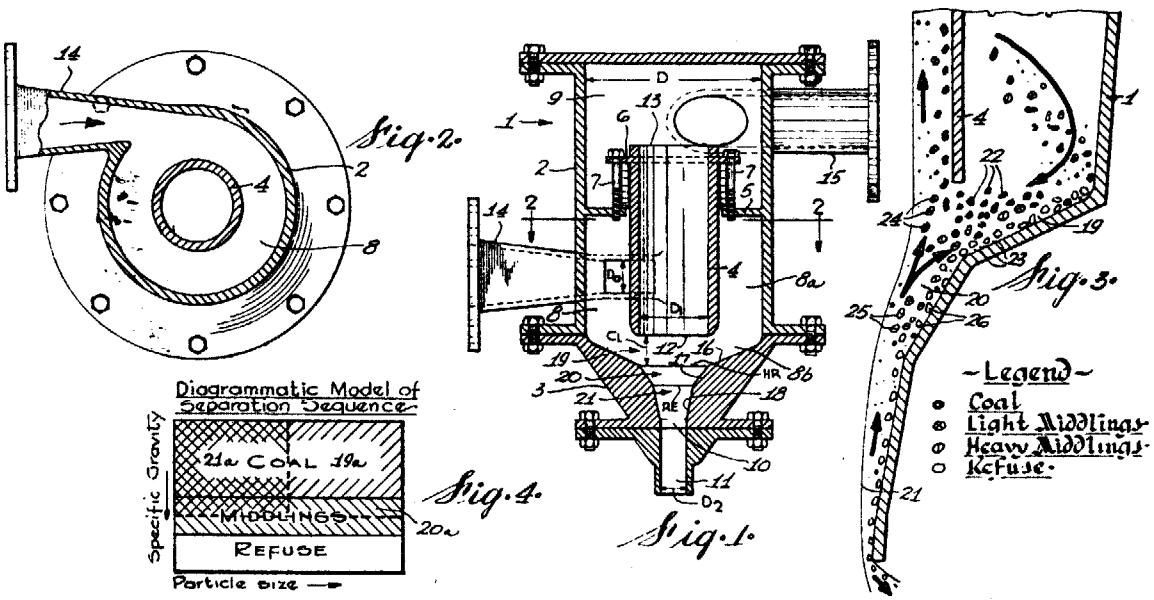
INVENTOR
Jan Visman
BY Weir, Marshall, MacRae, & Lamb.
PATENT AGENTS

APPARATUS FOR SPECIFIC GRAVITY SEPARATION OF SOLID PARTICLES

Original Filed June 10, 1966 4 Sheets-Sheet 2

INVENTOR
Jan Visman
BY
Weir, Marshall, MacRae, + Lamb.
PATENT AGENTS

APPARATUS FOR SPECIFIC GRAVITY SEPARATION OF SOLID PARTICLES

Original Filed June 10, 1966 4 Sheets-Sheet 3

INVENTOR
Jan Visman
BY
Weir, Marshall
MacRae & Lamb.
PATENT AGENTS

APPARATUS FOR SPECIFIC GRAVITY SEPARATION OF SOLID PARTICLES

Original Filed June 10, 1966 4 Sheets-Sheet 4

INVENTOR
Jan Visman
BY
Weir, Marshall
MacRae & Lamb
PATENT AGENTS

United States Patent Office

Re. 26,720
Reissued Nov. 25, 1969

26,720

APPARATUS FOR SPECIFIC GRAVITY SEPARATION OF SOLID PARTICLES

Jan Visman, Edmonton, Alberta, Canada, assignor, by mesne assignments, to Canadian Patents and Development Limited, Ottawa, Ontario, Canada, a corporation of Canada Original No. 3,353,673, dated Nov. 21, 1967, Ser. No. 556,756, June 10, 1966, which is a continuation-in-part of aplication Ser. No. 268,745, Mar. 28, 1963. Application for reissue Apr. 8, 1968, Ser. No. 724,678
Int. Cl. B04c *3/06;* B03d *3/00, 1/26*

U.S. Cl. 209—211 10 Claims

Matter enclosed in heavy brackets [ ] appears in the original patent but forms no part of this reissue specification; matter printed in italics indicates the additions made by reissue.

*ABSTRACT OF THE DISCLOSURE*

*A hydrocyclone having an upper cylindrical section and a lower section of tri-conical shape. The lower end of the vortex finder is located a predetermined distance from the line of juncture of the first and second conical portions of the lower section.*

Figure 5:
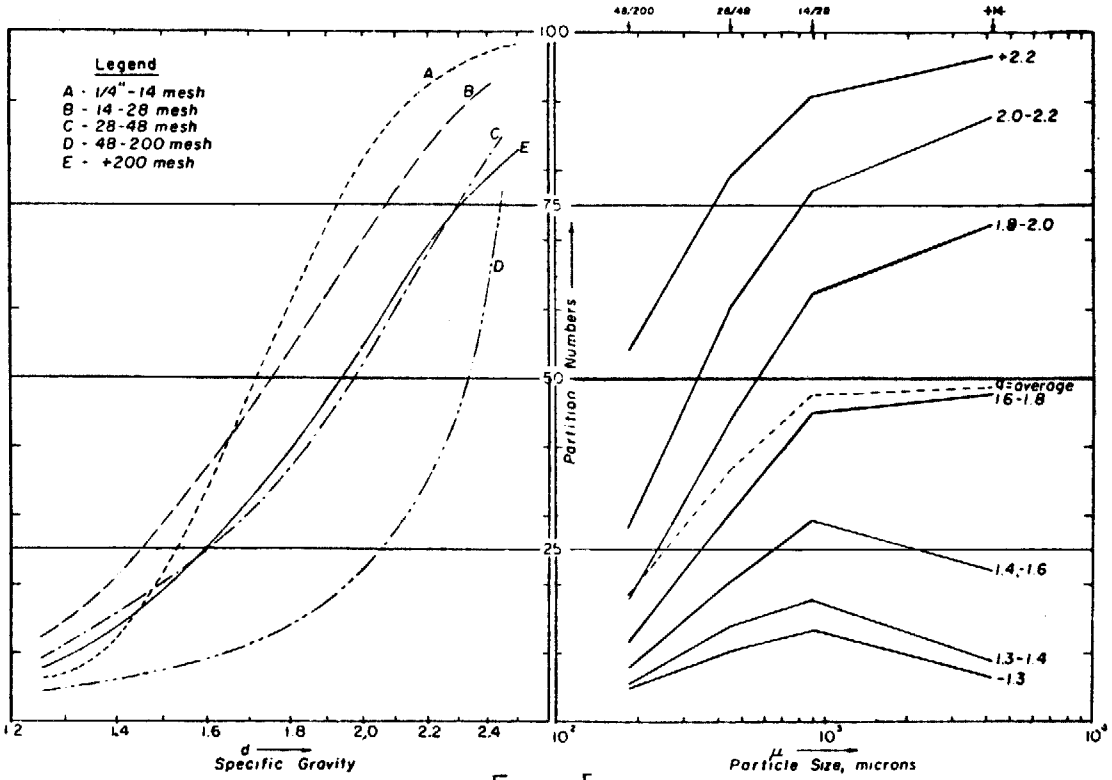

This application is a continuation-in-part of application Ser. No. 268,745, filed Mar. 28, 1963 (now abandoned), which was, in turn, a continuation-in-part of application Ser. No. 163,753, filed Jan. 2, 1962 (now abandoned). This invention relates to a process and apparatus for separating mixtures of solid particles into fractions according to specific gravity.

The cleaning of raw slack coal containing many fine particles and the concentration of finely divided ore pulps by separation according to specific gravity with the use of water presents a number of problems, some physical some technical, and some economical. These problems are set forth below:

Physical problems (1) Most existing machines for cleaning fine coal and ore pulps in watery suspension not only separate particles according to their individual specific gravity but also according to their individual sizes; the former separation may be termed "specific gravity separation" or "sorting," the latter "sizing" or "classification." Classification interferes with efficient specific gravity separation, especially for the small particles of, say, 35 mesh (420 microns) diameter and less. It is, of course, desirable to reduce this lower size limit of effective specific gravity separation.

(2) The range of cutpoints is limited. Some machines can only separate at fairly low cutpoints (separation gravities), and others at higher cutpoints only. The existing machines used for specific gravity separation have certain deficiencies which pose problems of a technical nature.

Technical problems (1) Machines designed to sort small particles efficiently generally have small capacity ( the wet concentrating table, the flotation cell) and require considerable space to make up for this. Machines designed to sort small particles in large quantities (dry table, rheolaveur) can do so only at a certain loss of efficiency, especially in the lower particle size fractions.

(2) A number of machines presently on the market are therefore designed to clean only materials from which the finest size fractions have been removed in advance. For instance, the heavy-medium hydrocyclone using magnetite suspension operates on a deslimed feed only when cleaning coal. This machine is highly efficient physically (sharp cut) and has a large capacity, but is cannot clean fine coal in bulk, as the presence of coal slimes would interfere with the recovery of magnetite.

Economic problems

Machines designed to clean fine coal or to concentrate ore in bulk efficiently are often too costly for the beneficiation of low-grade materials. There is an increasing demand for machines that will clean low-grade materials efficiently at a low cost. One such machine is the conventional water cyclone which cleans materials in bulk, in unstable suspension. It is compact, has a large capacity and compares favourably with other modern machines, as regards efficiency (e.g. with the feldspar jig) when used in series operation.

The main limitation of the conventional water cyclone is, that it does not operate efficiently at cutpoints higher than approximately 1.6 specific gravity.

An object of the present invention is to provide an apparatus for separating particle mixtures of wide size range into a fraction chiefly contaiing particles of a specific gravity which is lower, and a fraction containing particles of a specific gravity which is higher, than a certain specifice gravity, the separation according to size being held at a minimum.

Figure 6:
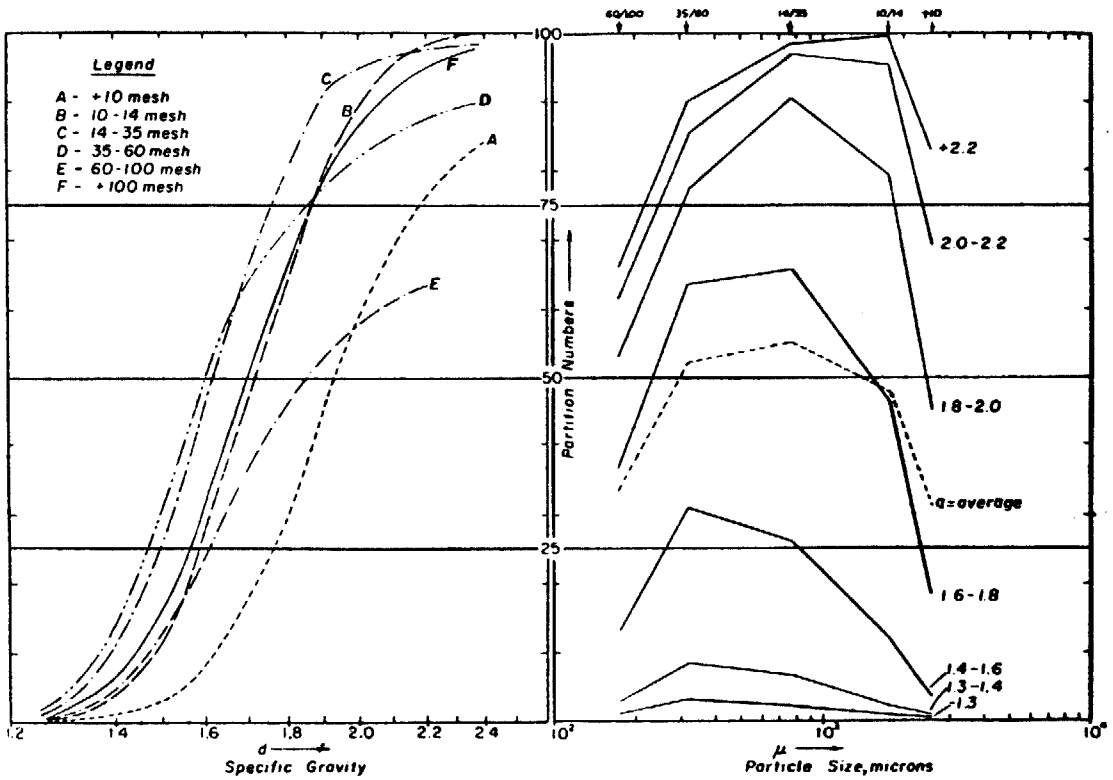
Figure 7:
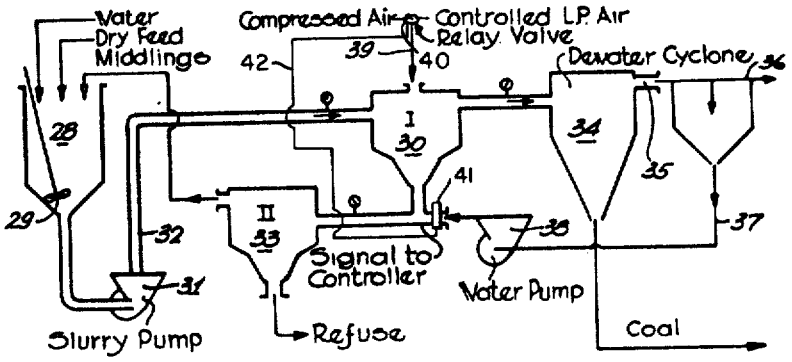
Figure 8:
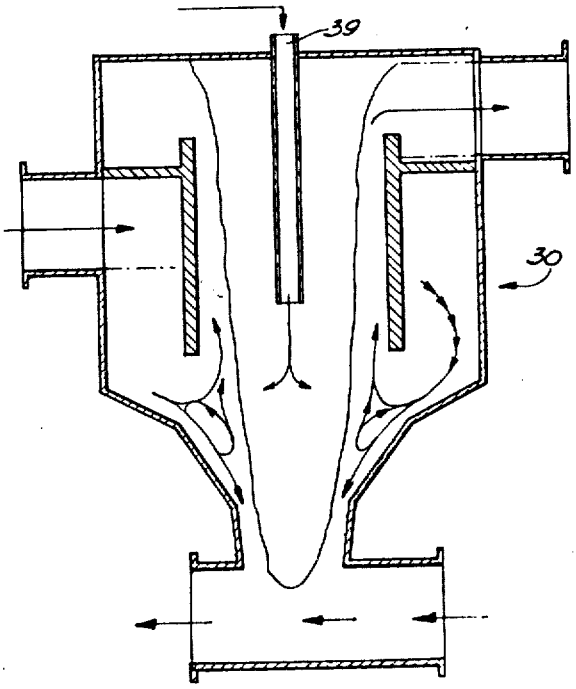

The invention will be described with reference to the accompanying drawings, in which FIGURE 1 is a sectional elevation of a water cyclone in accordance with the invention, FIGURE 2 is a sectional plan view on line 2—2 of FIGURE 1, FIG. 3 is a partial sectional elevation of the water cyclone in accordance with the invention showing the flow and separation pattern of the particles, FIGURE 4 is a diagrammatic model of one separation sequence, FIGURE 5 is a graph illustrating characteristics of the separating action of a conventional water cyclone, FIGURE 6 is a graph illustrating characteristics of the separating action of a water cyclone in accordance with the invention, and FIGURE 7 is a diagrammatic illustration of a two-stage cyclone unit, and FIGURE 8 is a diagrammatic elevation of a compound water cyclone operating under back pressure.

Referring to FIGURES 1 and 2, the water cyclone illustrated comprises a vessel 1 having an upper cylindrical section 2 and a lower conical section 3. *As shown, the conical section 3 is detachably fixed to the cylindrical section 2 as by means of bolts 43 for replacement with a section of, for instance, different included angles as required for varying circumstances of operation.* Axially disposed within section 2 and in spaced relation thereto is an open-ended conduit or vortex finder 4. The vortex finder may be mounted in section 2 by means of an annular flange 5 on section 2, annular flange 6 on the vortex finder, and a plurality of screws or the like 7. The structure described forms a lower hydrocyclone chamber 8 and an upper discharge chamber 9. Chamber 8 has an annular portion 8a and a lower inwardly tapered portion 8b terminating in a discharge aperture 10 at its apex. As shown, aperture 10 communicates with a discharge passage 11. Vortex finder 4 has, *in the position shown,* its lower end 12 disposed substantially in the lower terminal plane of chamber portion 8a and its upper end 13 disposed in chamber 9.

A feed or inlet pipe 14 leads tangentially into annular chamber portion 8a. A discharge pipe 15 leads from the discharge chamber 9.

In accordance with the invention, the tapered portion 8b of the hydrocyclone chamber 8 is defined by surfaces of three successive conical frusto 16, 17, 18 of increasing inclination towards the open aperture 10. Chamber protion 8b is thus constituted by three well-defined sections, namely, a first conical section 19 adjoining the annular chamber portion 8a and defined by the conical frustum 16 with an included angle of greater than 100°, say, of the order of 135°, a second conical section 20 adjoining section 19 and defined by the conical frustum 17 with an included angle substantially less than that of frustum 16 say, of the order of 75°, and a third conical section 21 adjoining section 20 and defined by conical frustum 18 with an included angle substantially less than that of frustum 17, say, of the order of 20°.

The essential feature of this compound conical portion of the cyclone chamber is that the taper decreases from the first to the third conical sections. Thus, the wall of the conical chamber portion is of convex shape as distinct from flat or concave walls as frequently employed in conical portions of cyclone chambers.

While the frustum walls 16, 17, 18 are shown as having flat surfaces in the illustrated embodiment, it will be apparent that they may be slightly curved into a continuous convex taper so long as they define the three sections as described.

In operation, the material to be cleaned or concentrated is pumped in the usual manner with water into the annular chamber portion 8a through feed pipe 14. Referring to FIGURE 3, the material is designated as coal composed of coarse light particles 22, fine light particles 23, light middlings 24, heavy middlings 25, and refuse 26.

It will be observed that, in section 19, the material becomes stratified, forming a hindered settling bed. The coarse, light particles 22 are forced or crowded towards the central current rising in the vortex finder 4 by incoming particles as they reach the hindered settling bed in flat section 19. Thus, the coarse particles 22 are entrained by the central current, carried to the discharge chamber 9, and discharged through pipe 15.

The remaining particles then enter section 20 where the middlings are separated into fractions of relatively low specific gravity and relatively high specific gravity by centrifugal action. The light middlings 24 are thus firstly entrained by the current rising through the vortex finder and are discharged through pipe 15. The heavy middlings 25 tend to recirculate to the stratified layer in section 19 and finally pass through the vortex finder and out the discharge pipe 15, or pass through the apex and discharge pipe 11, depending on the setting of the cyclone.

The fine light particles are elutriated in section 21 and leave through the vortex finder and discharge pipe 15.

The final constituent, the refuse, then leaves the cyclone through the apex orifice 10.

The separation sequence is diagrammatically illustrated for coal in FIGURE 4. Fractions 19a, 20a, and 21a are separated in sections 19, 20 and 21, respectively.

The present invention provides an improved separation according to specific gravity and a decreased separation according to size of particle mixtures by dividing the usual separation process within the conical portion of the cyclone chamber into the three well-defined consecutive steps, as described. The function and effect of these steps, as clearly indicated in tests, are recapitulated in greated detail as follows:

In the first step, the coarse particles of low specific gravity are separated from the remainder by stratification of the particles on the conical section 19 in a gyrating shifting bed of particles.

The coarse particles of low specific gravity are substantially repulsed by the hindered-settling bed and discharge through the vortex finder, via the central current around the air core.

The remaining bed of particles proceeds towards the apex into the second conical section 20 with the particles substantially retaining their stratified orientation.

In the second step, the particles of intermediate specific gravity forming a middlings fraction are separated into two specific gravity fractions by recirculation, as follows. The middlings are substantially located in the top layer of the remaining bed and are, therefore, the first ones to be entrained by the upward, rotating central current around the air core. The coarse middlings fraction of lower specific gravity are swept up by this central current and discharged from the cyclone chamber through the vortex finder. The coarse middlings fraction of higher specific gravity may bypass the vortex finder as a result of the centrifugal momentum to which they are subjected. The centrifugal momentum to which the coarse middlings of relatively high specific gravity are subjected is larger than that exerted on the coarse middlings of lower specific gravity. Consequently, the coarse heavy middlings fraction tends to recirculate to the stratified layer passing along the conical wall 17, in preference to the coarse light middlings fraction and finally enter section 21. A separation according to specific gravity is thus effected by a process of repetition.

In the third step, the smallest particles of low specific gravity that have been held captive in the interstices between the coarse particles of higher specific gravity in the stratified bed, are separated in the conical section 21, because the hindered settling bed is finally destroyed as the particles are fanning out along the conical wall into a thin layer that is subjected to elutriation by the central current. The central current in this lower part of the conical section is relatively weak. As a result, the smaller particles are now discharged via the central current and through the vortex finder, with preference to the small particles of lower specific gravity.

FIGURE 5 shows the gravity error curves of a conventional 75° water cyclone for slack coal. In the graph:

A—¼"–14 mesh (6.4–1.4 mm.)
B—14–28 mesh (1.4–0.59 mm.)
C—28–48 mesh (0.59–0.30 mm.)
D—48–200 mesh (0.30–0.07 mm.)
E—+200 mesh (>0.07 mm.)
q=average size-error curve
Ordinate: Partition Numbers
Abscissae: d=specific gravity, in g./cu.cm.
$\mu$=particle size, in microns The curves illustrate the relationship between the weight percentage apex product (dry material) per specific gravity fraction (partition numbers) for various size fractions of the infed particle mixture and show a relatively good separation for the coarse particles and an increasingly poorer specific gravity separation for the smaller particles. Also, the gravity error curves show a substantial difference in separation gravity between coarse particles and fine particles contained in the mixture. With reference to FIGURE 5, right, curves representing the relationship between the weight percentage of apex product (dry material) per size fraction (size error curves) for particles belonging to different specific gravity intervals of the infed particle mixture indicate a pronounced classification effect for the particles of high specific and to a lesser extent for the particles of low specific gravity.

FIGURE 6 shows the gravity error curves obtained for various size fractions when employing the present process and apparatus, as described. in the graph:

A—+10 mesh (>2.0 mm.)
B—10–14 mesh (2.0–1.4 mm.)
C—14–35 mesh (1.4–0.50 mm.)
D—35–60 mesh (0.50–0.25 mm.)
E—60–100 mesh (0.25–0.15 mm.)
F—+100 mesh (>0.15 mm.)
q=average size-error curve
Ordinate: Partition numbers
Abscissae:
d=specific gravity, in g./cu.cm.
$\mu$=particle size, in microns These curves illustrate the improved gravity concentration for all size fractions, by the increased slope of the individual gravity error curves and the close proximity of the separation gravities for the various size fractions, as compared to the corresponding curves of FIGURE 5.

With reference to FIGURE 6, right, the size error curves for particles belonging to various specific gravity fractions of slack coal illustrate the reduced effect of size classification as compared to that for identical size fractions shown on FIGURE 5, right.

It will be observed that the cutpoints of the various size fractions represented by the gravity error curves in the left section of FIGURE 6 are fairly close together. It is noted that the cutpoint for the coarse fraction at 1.93 is the highest. Cutpoints of successive size fractions are lower at 1.72, 1.62 and 1.60 respectively, with the smallest fraction of 60–100 mesh (0.147–0.246 mm.) being cut higher again, at 1.85 specific gravity.

The explanation of this reversal of the cutpoints follows from a close examination of the size error curves presented in the righthand part of FIGURE 6. It is observed that, firstly, noticeable interference of classification with the gravity separation is limited to the smallest size fraction 60 x 100 mesh (0.147–0.246 mm.) only, as shown by the steeply inclined part at the lefthand side of the size error curves, especially the ones for the heavier particle fractions (above 1.4 specific gravity). The cutpoint for this smallest size fraction, is, at 1.85 specific gravity, not too high. The steeply inclined parts of the size error curves appear to converge to a focal area corresponding with a particle size of roughly 100 mesh (0.147 mm.) on the abscissa (not shown on FIGURE 6). This would indicate that owing to classification, there is no noticeable cleaning effect for particles of slack coal or less than 100 mesh (0.147 mm.).

Secondly, the two middle sections of the size error curves, between $^{35}/_{60}$ and $^{10}/_{14}$ mesh (av. 0.33–1.58 mm.) average out to a fairly flat interval which shows that here, the gravity separation is no longer adversely affected by classification.

Lastly, in the coarse size range the size error curves are sharply reversed, especially for the particles of high specific gravity. This shows that the proportion of coarse particles discharged through the apex is lower than average; in other words, the coarse particles are cleaned at a relatively high cutpoint, as was already clear from the gravity error curves. The separation of the coarse light particles takes place in the flat-conical section of the compound water cyclone. The cutpoint is primarily determined by the diameter and length of the vortex finder. By choosing the correct settings, the range of the cutpoints for the various size fractions can thus be reduced to a minimum, resulting in a better overall separation.

The above results were obtained in closed circuit operation with a feed concentration of approximately 10% solids and an inlet pressure of 7.5 p.s.i. (½ atmospheres). The overall cutpoint for the +100 mesh was 1.70 specific gravity. The overall error curve for the +100 mesh fraction showed a probable error $r=0.155$, which at $d_p=1.70$ corresponds to an imperfection $I=0.22$.

The compond water cyclone described has a wide application and is adaptable for incorporation in many circuit variations depending upon the treatment required.

For instance, a compound water cyclone plant in accordance with the invention may comprise a two-stage or a multiple stage arrangement of cyclones composed of, say, a two-stage circuit in combination with one or more single-stage or two-stage circuits in tandem.

A two-stage circuit is illustrated in FIGURE 7, which shows by way of example a typical form of arrangement. The dry feed and water are fed into a mixing vessel 28 to produce a slurry as by means of an agitator 29. The slurry is introduced into the inlet of a first compound water cyclone 30 in accordance with the invention by means of pump 31 in line 32. The underflow product of cyclone 30 is fed into the inlet of a second compound water cyclone 33 in accordance with the invention. The overflow product of cyclone 33 is returned to the vessel 28 while the underflow product goes to refuse.

The overflow product of cyclone 30 is dewatered in a conventional dewatering cyclone 34 from which the dewatered coal or other product is obtained. The separated water flows out of cyclone 34 at 35. A portion of such water may flow to waste at 36 and a portion may be cleaned and employed to supply water to the feed of cyclone 33 through line 37 and pump 38.

An important feature of the multi-stage system resides in maintaining a controlled air pressure in the vortex of cyclone 30 by means of compressed air entering through, for instance, a coaxial tube at the top thereof. This feature is illustrated at 39 in FIGURES 7 and 8. Compressed air enters the tube through a controlled low pressure air relay valve 40 of conventional form. Operation of the valve is controlled by signal means 41 responsive to pressure in the underflow pulp of cyclone 30 through line 42 whereby the air pressure in the vortex is varied proportionally to the pressure of the underflow pulp of cyclone 30.

Introduction of compressed air in the order of $^{1}/_{10}$ cubic foot per minute permits effective operation of the primary cyclone under back pressure, whereas without such automatic control the vortex would collapse and the flow pattern inside cyclone 30 would be changed in such a manner that it would render the sorting operation of cyclone 30 ineffective.

Operation under back pressure has the further advantage that it reduces the number of slurry pumps required from three to one in the system illustrated, including pump sumps and piping.

Another function of such air control is that when, as a result of a chance variation in the composition of the raw feed, the solids concentration of pulp entering cyclones 33 and 34 is temporarily changed, the air pressure in cyclone 30 also changes, to the effect that it tends to counteract any changes in the cutpoint of cyclone 30.

Tests have indicated that the separation efficiency of the compound water cyclone described has relation to the following conditions:

(1) The diameter of the cyclone chamber portion 8a should not be too large in relation to the top size of the particles contained in the feed in order to achieve most effective stratification and subsequent separation in the hindered-settling bed. While the maximum ratio in this regard will ordinarily be approximately 25:1 this figure of 25 can be raised to 50 or even 100 depending upon how easy the material is to separate and upon the quality requirements with relation to separating efficiency. The minimum size of the cyclone diameter is also preferably determined by the maximum particle size of the feed. Thus, the diameter of the cyclone chamber 8a should preferably not be less than approximately 10 times the top size of the feed particles in order to avoid plugging of the apex orifice 10.

(2) The compound water cyclone, while applicable at low cutpoints, is specifically suited to operate at higher cutpoints, including the entire range of specific gravities represented by the material that is to be separated. It follows that large particles require large compound water cyclones, small particles require small compound water cyclones. A large compound water cyclone would be one with a diameter of, for instance 2 feet and would handle approximately 70 t.p.h. solids of 1 x 0 in. raw slack at 21 p.s.i. inlet pressure. If it is required to clean fine-grained materials, it becomes desirable to use small cyclones in multiple units known as multi-cyclone units. A suitable cyclone for cleaning, any −10 mesh pulps using water only, would be a compound water cyclone with a diameter of 2 in. A multiple unit containing 24 compound water cyclones would have a capacity of 175–350 g.p.m. at 6–25 p.s.i. inlet pressure and process 3–7 t.p.h. dry feed.

The dimensions and geometry of the cyclone described are of substantial significance in obtaining optimum efficiency in the gravity separation operation thereof. Referring again to FIGURE 1, the following dimensions are indicated:

D—diameter of main cyclone chamber
$D_1$—inside diameter of vortex finder
$D_0$—diameter of inlet opening
$D_2$—diameter of apex opening
$H_R$—plane of intersection of conical frusta 16 and 17
RE—plane of intersection of conical frusta 17 and 18
$D_{HR}$—inside diameter at plane HR
$D_{RE}$—inside diameter at plane RE
Cl—vortex finder clearance, i.e., the vertical distance between the lower orifice edge of the vortex finder and plane HR It will be observed that the inlet is indicated as having a diameter although it is shown as rectangular or square which is its preferable cross-sectional form. However, it is more convenient for purposes of calculation to convert it to circular form and it will be understood that the diameter $D_0$ includes reference to circular openings or equivalent non-circular openings.

The inlet opening diameter $D_0$ is desirably related to the chamber diameter D as follows:

(I) $$D=a\ D_0$$

where a has the range 3.5–5.

The lower limit of diameter $D_0$ is determined by the consideration that a smaller inlet opening would only be operative when using relatively high inlet pressures, which in turn would cause excessive wear. Obviously, it is desirable to operate the cyclone at the lowest possible pressure. The higher limit of diameter $D_0$ is determined by the fact that a larger inlet opening would cause the solid material entering the cyclone to hit the outside wall of the vortex finder.

The diameter $D_1$ of the vortex finder is preferably related to the chamber diametre D as follows:

(II) $$D=b\ D_1$$

where b has the range 2–3.

The lower limit of diameter $D_1$ is determined by the relationship that exists between the vortex finder and the compound cone. It has been found from experiments that for narrower vortex finders the classification effect of the cyclone increases rapidly. The upper limit of diameter $D_1$ is determined by the fact that a wider vortex finder obstructs the free entry of the material into the cyclone.

The relation of the vortex finder clearance Cl to the chamber diameter D is of major importance and is indicated as follows:

(III) $$D=e\ Cl$$

where e has the range 2.5–10.

The lower limit of clearance Cl is determined by the top size of the particles passing through the cyclone. The upper limit of clearance Cl is determined by the fact that for larger vortex finder clearances the amount of material emitted through the vortex finder is negligible under otherwise normal operating conditions of size consist and feed concentration.

The apex opening diameter $D_2$ is preferably related to the chamber diameter D as follows:

(IV) $$D=c\ D_2$$

where c has the range 4–6.

The lower limit of diameter $D_2$ is determined by the fact that for smaller apex openings the cyclone will produce a "rope" discharge (rather than a "spray" discharge) through the apex which is detrimental to an efficient gravity separation. The upper limit of diameter $D_2$ is determined by the fact that when the apex diameter becomes larger, the amount of material emitted through the vortex finder is negligible under otherwise normal operating conditions of size consist and feed concentration.

The inside diameter at plane HR, $D_{HR}$ is related to the chamber diameter D as follows:

(V) $$D=f\ D_{HR}$$

where f has the range 2–3.

The inside diameter at plane RE, $D_{RE}$ is related to the chamber diameter D as follows:

(VI) $$D=g\ D_{RE}$$

where g has the range 3–4.

The relationships set forth in I–VI above may be summarized as follows:

$$D=a\ D_0=b\ D_1=c\ D_2=e\ Cl=f\ D_{HR}=g\ D_{RE}$$

wher the coefficients have the following ranges:

a=3.5–5
b=2–3
c=4–6
e=2.5–10
f=2–3
g=3–4

A somewhat more limited relationship may be set forth as follows:

$$D/4=D_0=D_1/2=D_2=Cl=D_{HR}/2=D_{RE}\times 3/4$$

where:

$D_0/D=0.20–0.25$
$D_1/D=0.3–0.5$
$Cl/D=0.1–0.4$
$D_2/D_1=0.3–0.6$

The included angles of the three conical frusta 16, 17 and 18 have been given by way of example as 135, 75, and 20 degrees. For optimum results these angles should be in the respective ranges of 100–140°, 70–80° and 15–30°, and may be set forth somewhat more specifically as being in the respective ranges of 128°–143°, 68°–83°, and 14°–29°.

It will be apparent that having determined the diameters $D_{HR}$ and $D_{RE}$ and the angles of the three conical frusta the lengths of conical sections 16, 17 and 18 are thereby fixed.

While the invention has been described as applied to the treatment of coal, it will be understood that the invention applies equally well to the beneficiation of ores, the ore concentrate being separated and discharged through the apex orifice and the refuse being separated and discharged through the vortex finder.

I claim:

1. A compound water cyclone comprising a vessel, a tubular vortex finder axially arranged within said vessel and having an upper edge and a lower edge, said vessel having a cyclone chamber therein, said chamber having an upper annular portion surrounding said vortex finder, and a contiguous lower conical portion below said vortex finder, said conical portion having an apex orifice and three successive frusto-conical sections of decreasing included angle extending from said annular portion to said orifice, a first one of said frusto-conical sections having an included angle of about 100–140°, a second one of said frusto-conical sections having an included angle of about 70–80°, and a third one of said frusto-conical sections having an included angle of about 15–30°, said annular portion of said chamber having an inlet leading tangentially thereinto, said chamber having a cylindrical portion above said vortex finder and an outlet leading therefrom, said first and second frusto-conical sections having a first circular line of juncture lying in a first transverse plane, said second and third frusto-conical sections having a second circular line of juncture lying in a second transverse plane, the dimensions of said chamber being in accordance with the relationship $$D=a\ D_0=b\ D_1=c\ D_2=e\ Cl=f\ D_{HR}=g\ D_{RE}$$

wherein D is the diameter of said upper portion of said chamber, $D_1$ is the inside diameter of said vortex finder, $D_0$ is the diameter of said inlet opening, $D_2$ is the diameter of said apex opening, $D_{HR}$ is the diameter of said first circular line of juncture, $D_{RE}$ is the diameter of said second circular line of juncture, and Cl is the perpendicular distance between said lower edge of said vortex finder and said first plane, and the coefficients have the following ranges: a, 3.5 to 5; b, 2 to 3; c, 4 to 6; e, 2.5 to 10; f, 2 to 3; g, 3 to 4.

2. Apparatus for separating mixtures of solid particles which comprises first and second compound water cyclones each comprising a vessel and a tubular vortex axially arranged within said vessel and having an upper edge and a lower edge, said vessel having a cyclone chamber therein, said chamber having an upper annular portion surrounding said vortex finder and a lower conical portion below said vortex finder, said conical portion having an apex orifice and three successive frusto-conical sections of decreasing included angle extending from said annular portion to said orifice, a first one of said frusto-conical sections having an included angle of about 100–140°, a second one of said frusto-conical sections having an included angle of about 70–80°, and a third one of said frusto-conical sections having an included angle of about 15–30°, said annular portion of said chamber having an inlet leading tangentially thereinto, said chamber having a cylindrical portion above said vortex finder and an outlet leading therefrom, said first and second frusto-conical sections having a first circular line of juncture lying in a first transverse plane, said second and third frusto-conical sections having a second circular line of juncture lying in a second transverse plane, the dimensions of said chamber being in accordance with the relationship $$D=a\ D_0=b\ D_1=c\ D_2=e\ Cl=f\ D_{HR}=g\ D_{RE}$$

wherein D is the diameter of said upper portion of said chamber, $D_1$ is the inside diameter of said vortex finder, $D_0$ is the diameter of said inlet opening, $D_2$ is the diameter of said apex opening, $D_{HR}$ is the diameter of said first circular line of juncture, $D_{RE}$ is the diameter of said second circular line of juncture, and Cl is the perpendicular distance between said lower edge of said vortex finder and said first plane, and the coefficients have the following ranges: a, 3.5 to 5; b, 2 to 3; c, 4 to 6; e, 2.5 to 10; f, 2 to 3; g, 3 to 4; a slurry forming vessel, a slurry feeding line leading from said vessel to said chamber inlet of said first cyclone, an underflow product line leading from said apex orifice of said first cyclone to said chamber inlet of said second cyclone, and an overthrow product line leading from said outlet of said second cyclone to said vessel.

3. Apparatus for separating mixtures of solid particles as defined in claim 2, wherein said first compound water cyclone operates under back pressure and further comprising means for introducing compressed air to maintain a vortex in said first compound water cyclone and means for controlling the pressure of said compressed air in accordance with the pressure in said underflow product line of said first compound water cyclone.

4. Apparatus for separating mixtures of solid particles which comprises first and second compound water cyclones each comprising a vessel and a tubular vortex finder axially arranged within said vessel and having an upper edge and a lower edge, said vessel having a cyclone chamber therein, said chamber having an upper annular portion surrounding said vortex finder and a lower conical portion below said vortex finder, said conical portion having an apex orifice and three successive frusto-conical sections of decreasing included angle extending from said annular portion to said orifice, a first one of said frusto-conical sections having an included angle of about 128–143°, a second one of said frusto-conical sections having an included angle of about 68–83°, and a third one of said frusto-conical sections having an included angle of about 14–29°, said annular portion of said chamber having an inlet leading tangentially thereinto, said chamber having a cylindrical portion above said vortex finder and an outlet leading therefrom, said first and second frusto-conical sections having a circular line of juncture lying in a first transverse plane, said second and third frusto-conical sections having a circular line of juncture lying in a second transverse plane, the ratio of the perpendicular distance between said lower edge of said vortex finder and said first plane to the diameter of said upper portion of said chamber being in the range of 0.1 to 0.4, said chamber having the relationship $$D/4=D_0=D_1/2=D_2=Cl=D_{HR}/2=D_{RE}\times 3/4$$

wherein D is the diameter of said upper portion of said chamber, $D_1$ is the inside diameter of said vortex finder, $D_0$ is the diameter of said inlet opening, $D_2$ is the diameter of said apex opening, $D_{HR}$ is the diaameter of said first circular line of juncture, $D_{RE}$ is the diameter of said second circular line of juncture, and Cl is said perpendicular distance, a slurry forming vessel, a slurry feeding line leading from said vessel to said chamber inlet of said first cyclone, an underflow product line leading from said apex orifice of said first cyclone to said chamber inlet of said second cyclone, and an overflow product line leading from said outlet of said second cyclone to said vessel.

5. Apparatus for separating mixtures of solid particles as defined in claim 4, inclduing a compressed air inlet tube extending axially into said vortex finder of said first cyclone.

6. A compound water cyclone comprising a vessel, a tubular vortex finder axially arranged within said vessel and having an upper edge and a lower edge, said vessel having a cyclone chamber therein, said chamber having an upper annular portion surrounding said vortex finder and a contiguous lower conical portion below said vortex finder, said conical portion having an apex orifice and three successive frusto-conical sections of decreasing included angle extending from said annular portion to said orifice, a first one of said frusto-conical sections having an included angle of about 128–143°, a second one of said frusto-conical sections having an included angle of about 68–83°, and a third one of said frusto-conical sections having an included angle of about 14–29°, said annular portion of said chamber having an inlet leading tangentially thereinto, said chamber having a cylindrical portion above said vortex finder and an outlet leading therefrom, said first and second frusto-conical sections having a first circular line of juncture lying in a first transverse plane, said second and third frusto-conical sections having a second circular line of juncture lying in a second transverse plane, the ratio of the perpendicular distance between said lower edge of said vortex finder and said first plane to the diameter of said upper portion of said chamber being in the range of 0.1 to 0.4, said chamber having the relationship $$D/4=D_0=D_1/2=D_2=Cl=D_{HR}/2=D_{RE}\times 3/4$$

wherein D is the diameter of said upper portion of said chamber, $D_1$ is the inside diameter of said vortex finder, $D_0$ is the diameter of said inlet opening, $D_2$ is the diameter of said apex opening, $D_{HR}$ is the diameter of said first circular line of juncture, $D_{RE}$ is the diameter of said second circular line of juncture, and Cl is said perpendicular distance.

*7. A compound water cyclone for specific gravity separation of mixtures of multi-size solid particles in liquid suspension which comprises a vessel, a tubular*

*vortex finder axially arranged within said vessel and having an upper edge and a lower edge, said vessel having a cyclone chamber therein, said chamber having an upper portion, an outlet leading from said upper portion, an annular portion surrounding said vortex finder, an inlet for said mixtures leading tangentially into said annular portion, and a lower conical portion below said annular portion, said conical portion having an apex orifice and three successive frusto-conical sections of decreasing included angle extending to said orifice, a first one of said frusto-conical sections having an included angle of about 100–140° and being relatively flat to provide a hindered settling bed of particles, a second one of said frusto-conical sections having an included angle of about 70–80° to provide a centrifugally effected particle separation zone, and a third one of said frusto-conical sections having an included angle of about 15–30° for elutriation of fine particles through said vortex finder and said outlet, the perpendicular distance between said lower edge of the vortex finder and the plane of the circular line of juncture of said first and second frusto-conical sections having a ratio to the diameter of said upper portion of said chamber in the range of about 0.1 to about 0.4.*

*8. A compound water cyclone as defined in claim 7, said vessel having a first section defining said upper and annular portions of said chamber, and a second section defining said conical portion of said chamber detachably fixed to said first vessel section.*

*9. A compound water cyclone as defined in claim 8 including means supporting said vortex finder in said first vessel section for axial adjustment therein in accordance with said perpendicular distance.*

*10. Apparatus for the specific gravity separation of mixtures of multi-size solid particles in liquid suspension which comprises first and second compound water cyclones each comprising a vessel, a tubular vortex finder axially arranged within said vessel and having an upper edge and a lower edge, said vessel having a cyclone chamber therein, said chamber having an upper portion, an outlet leading from said upper portion, an annular portion surrounding said vortex finder, an inlet for said mixtures leading tangentially into said annular portion, and a lower conical portion below said annular portion, said conical portion having an apex orifice and three successive frusto-conical sections of decreasing included angle extending to said orifice, a first one of said frusto-conical sections having an included angle of about 100–140° and being relatively flat to provide a hindered settling bed of particles, a second one of said frusto-conical sections having an included angle of about 70–80° to provide a centrifugally effected particle separation zone, and a third one of said frusto-conical sections having an included angle of about 15–30° for elutriation of fine particles through said vortex finder and said outlet, the perpendicular distance between said lower edge of the vortex finder and the plane of the circular line of juncture of said first and second frusto-conical sections having a ratio to the diameter of said upper portion of said chamber in the range of about 0.1 to about 0.4; a slurry forming vessel, a slurry feeding line leading from said vessel to said chamber inlet of said first cyclone, an underflow product line leading from said apex orifice of said first cyclone to said chamber inlet of said second cyclone, an overflow product line leading from said outlet of said second cyclone to said vessel, means for introducing compressed air to maintain a vortex in said first compound water cyclone and means for controlling the pressure of said compressed air in accordance with the pressure in said underflow product line of said first compound water cyclone.*

References Cited

The following references, cited by the Examiner, are of record in the patented file of this patent or the original patent.

UNITED STATES PATENTS

| | | | |
|---|---|---|---|
| 2,573,192 | 10/1951 | Fontein | 209—211 X |
| 2,819,795 | 1/1958 | Fontein et al. | 209—211 |
| 2,849,930 | 9/1958 | Freeman et al. | 209—211 X |
| 2,913,112 | 11/1959 | Stavenger et al. | 209—211 |
| 2,982,409 | 5/1961 | Boadway et al. | 209—211 |

FOREIGN PATENTS

| | | |
|---|---|---|
| 1,037,980 | 5/1953 | France. |

FRANK W. LUTTER, Primary Examiner